May 11, 1937.                    R. J. KEHL                    2,079,807
                                 FLUID FILTER
                              Filed July 27, 1934
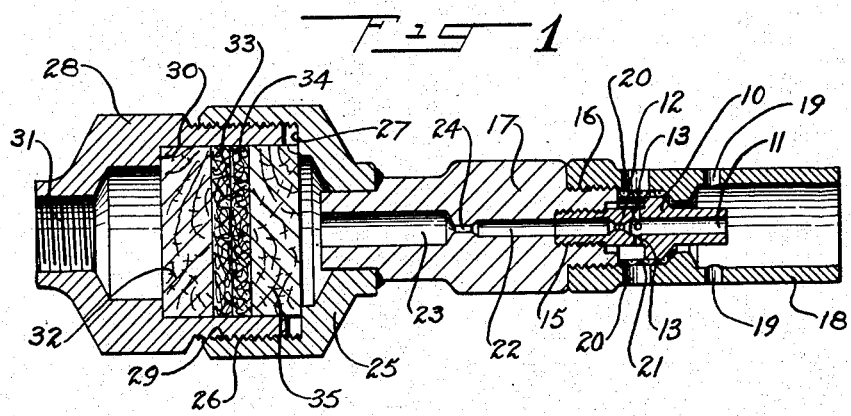
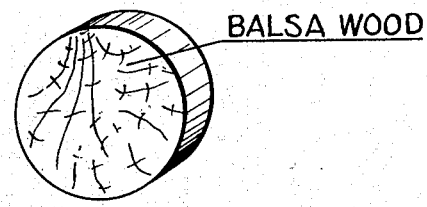
INVENTOR
ROBERT J. KEHL
BY
ATTORNEY Patented May 11, 1937

2,079,807

UNITED STATES PATENT OFFICE 2,079,807

FLUID FILTER

Robert J. Kehl, Bayside, N. Y., assignor, by mesne assignments, to Union Carbide and Carbon Corporation, a corporation of New York Application July 27, 1934, Serial No. 737,173

5 Claims. (Cl. 183—44)

This invention relates to fluid filters and more particularly to a filter construction and a filter material for use in removing particles of foreign matter from a fluid stream. The invention is especially useful in connection with the removal of minute particles of foreign matter from a stream of gas, such as acetylene, flowing through a blowpipe conduit or passage.

All blowpipes are subject to occasional backfiring or popping. As a consequence of this action carbon in various degrees of fineness, some of it almost in the amorphous state, is deposited in the passages of the blowpipe. Such deposits of carbon are picked up by the fuel gas stream and continue therewith in the direction of its normal flow. Some of this carbon passes through the protecting screens and builds up a deposit in or back of any metering or injecting orifices in the line, the particles frequently proving to be mutually adherent and forming a fluffy ball on the inlet side of an orifice which is peculiarly objectionable in the case of pilot lights through which the rush of fuel gas is necessary for proper operation. Other particles of carbon adhere to and clog the protecting screen or screens.

It has been found that the screen or gauze filter now generally used to protect orifices in blowpipes, particularly in pilot light constructions, become clogged in a comparatively short time and also that they fail to prevent clogging of the orifices which they are designed to protect. Frequent disassembly of the pilot light apparatus therefore becomes necessary with attendant expense and inconvenience.

An important object of the present invention is, therefore, to provide a filtering material which will not become clogged with foreign particles, and which at the same time will prevent passage of foreign particles to passages beyond the filter, and will not unduly restrict the passage of the fuel gas. A further object is the provision of a simple and effective fluid filter having a small number of parts. Other objects will be apparent upon consideration of the present specification.

The invention is shown by way of illustration in the accompanying drawing, in which:

Fig. 1 is a longitudinal mid-section of a filter constructed in accordance with the invention, together with a pilot light assembly; and Fig. 2 is a perspective view of one of the filtering elements.

As a result of many tests and much experimentation I have discovered that balsa wood forms a filtering medium which is peculiarly effective in removing foreign particles from fluids; and that balsa wood is especially effective in extracting the small bits of carbon which may be carried by acetylene and other fuel-gas. As is well known, balsa wood has a very light and somewhat porous structure having innumerable interstices which are arranged in no particular form or pattern and which yet permit substantially free passage of a gas or fluid therethrough. Experiments have proved that balsa wood is unexpectedly more effective than other porous materials both organic and inorganic, and actual tests have indicated the superiority of this material for the stated purpose. Even after many times the length of service possible with other screens it has been found that a balsa wood filter is exceptionally effective in preventing passage of carbon particles therethrough, and that where discoloration of the orifices beyond the balsa wood filter indicate that some carbon has passed the filter, no actual deposit of carbon can be found in or about the orifices. Furthermore, in certain types of service, it has been found desirable to insert one or more layers of felt or other agglutinated fabric between two blocks of balsa wood in forming the filter.

A form of filter in which balsa wood blocks or discs are used is shown in the drawing forming a part of this specification. Referring now more particularly to the drawing, and especially to Fig. 1, it will be seen that there is shown a pilot light nozzle 10 having a bore 11 therein, and a restricted orifice 12 in this bore. Radial passages 13 extend through the nozzle to the bore 11 on the exit side of the orifice 12, so that the stream of fuel-gas passing through the orifice aspirates into the bore 10 any fluid, such as air, which may be present at the outer openings of the passages 13. An externally threaded end 15 of the nozzle 10 is screwed into a similarly internally threaded counterbore 16 in a conduit member 17 thereby attaching the nozzle to the end of the conduit member. A cylindrical shield 18, internally threaded at one end, may be screwed on external threads of the conduit member into a position to protect the flame issuing from the pilot nozzle 10. Radial ports 19 in the shield provide means for the passage of combustion supporting air to the flame issuing from the nozzle end; and other ports 20 allow passage of air to the air passages 13. A screen 21 may be held in place between the nozzle and the shield covering the ports 20, to prevent foreign matter from entering the passages 13.

The conduit member 17 has a longitudinal axial bore through it for passage of fuel-gas to the nozzle 10. This bore is divided into three sections. A section 22 of the bore adjacent the nozzle has substantially the same diameter as the nozzle bore in which it terminates, and extends nearly half the length of the conduit member. Another section 23 of the bore, having a larger diameter, extends from the inlet side of the conduit member to a short section 24 of the bore having a greatly reduced diameter, which connects the sections 22 and 23. The function of the section 24 is that of providing an orifice of restricted cross-section which serves to regulate with reasonable accuracy the amount of low pressure gas passing to the nozzle 10.

The filter elements are held in place at the intake end of the conduit member 17. A short tube section 25 having an end soldered, welded, or otherwise attached to the end of the conduit member 17, which is farthest from the nozzle 10, has an enlarged portion which is internally threaded at 26 and which has an annular shoulder 27 in which the threads terminate. A nipple 28 has a similar enlarged section with external threads 29 thereon which are adapted to screw into the threads in the tube section 25. The nipple 28 has an internal annular shoulder 30 opposite the internal annular shoulder 27 of the short tube section for a purpose which will presently appear. The outer or intake end of the nipple 28 has a reduced internally threaded end 31 by which the nipple and all parts connected thereto may be joined to a fuel-gas supply line.

The filtering elements through which the fuel-gas passes before reaching the nozzle 10 are held in place between the annular shoulder 27 of the short tube section and the annular shoulder 30 of the nipple 28. The distance between the outer faces of the filtering elements or series of filtering elements being greater than the depth of the threads on the short tube section and the nipple, it is possible to hold the filtering elements tightly in place by screwing the nipple member tightly into the short tube section.

In many instances it has been found convenient to employ two blocks of balsa wood separated by two thicknesses of felt or agglutinated fabric, and as here shown one block of balsa wood 32 in the form of a disc having a diameter equal to the internal diameter of the enlarged section of the nipple 28 abuts the annular shoulder 30 thereof, and two discs 33 and 34 of felt having an equal diameter separate the balsa wood disc 32 from a similar disc of balsa wood 35, which, in turn, abuts the internal annular shoulder 27 of the short tube section 25. The total depth of the filtering elements is such that the inner end of the nipple 28 will not reach the annular shoulder 27 of the short tube section when the former is screwed tight upon the latter. The filtering elements may thus be held firmly in place between the nipple and the tube section, and any fuel-gas passing through the end 31 of the nipple must pass through each of the filtering elements before entering the bore 23 of the conduit member 17. The orifices and passages of reduced section beyond the filter are thereby protected from any solids in the fuel-gas of a size which is likely to clog them.

It will be appreciated that the blocks of balsa wood and the layers of felt may be cut in different shapes and may be employed in filters of other form than that here shown and described. It will also be appreciated that such filters may be employed for different purposes and different fluids without departing from the proper scope of the invention.

I claim:

1. A filter for removing carbon particles from acetylene gas, including filtering material comprising a block of balsa wood.

2. A filter for removing small particles from a fuel gas including filtering material comprising a plurality of separated blocks of balsa wood.

3. A filter for removing small particles from a fuel gas including filtering material comprising a plurality of blocks of balsa wood and at least one layer of agglutinated fabric spacing said blocks.

4. For use with a blowpipe subject to backfiring and utilizing a fuel gas which produces a deposit of carbon within the gas supply passage of the blowpipe during such backfiring, a filter comprising balsa wood adapted to arrest the flow of such carbon with at least a portion of the fuel gas.

5. For use with a blowpipe and a burner utilizing a fuel gas, such blowpipe being subject to backfiring which produces a deposit of carbon within the gas supply passage of the blowpipe and the burner, a filter comprising balsa wood adapted to arrest the flow of such carbon with the fuel gas passing to said burner.

ROBERT J. KEHL.